United States Patent [19]

Fromme et al.

[11] 3,753,485
[45] Aug. 21, 1973

[54] BRANCHING DEVICE AND GUIDE MEANS FOR HIGH-SPEED TRAY CONVEYORS

[75] Inventors: Hans-Georg Fromme, Wetzlar; Erich Lehberger, Dornholzhausen, both of Germany

[73] Assignee: Fa Fromme, Wetzlar, Germany

[22] Filed: Feb. 9, 1972

[21] Appl. No.: 224,771

[30] Foreign Application Priority Data
Oct. 13, 1971  Germany.................. P 21 50 984.2

[52] U.S. Cl. ............... 198/31 AC, 198/78, 198/127
[51] Int. Cl. ....................... B65g 13/02, B65g 47/26
[58] Field of Search ............ 198/31 AC, 66, 127 R; 193/36; 104/96, 130

[56] References Cited
UNITED STATES PATENTS
1,732,376  10/1929  Olson................................ 193/36 X
3,613,864  10/1971  Lingg..................................... 193/36

*Primary Examiner*—Edward A. Sroka
*Attorney*—Otto John Munz et al.

[57] ABSTRACT

Branching device and guide means for a high speed tray conveyor where each tray has in its bottom an hourglass-shaped central guide groove and the conveyor includes in its bend sections and branching sections groups or horizontal guide rollers engaging the tray grooves. In the branching section these guide roller groups are arranged to be raised and lowered by solenoids in staggered timing to permit a rapid succession of trays travelling through the branching section while the latter switches in and out.

13 Claims, 4 Drawing Figures

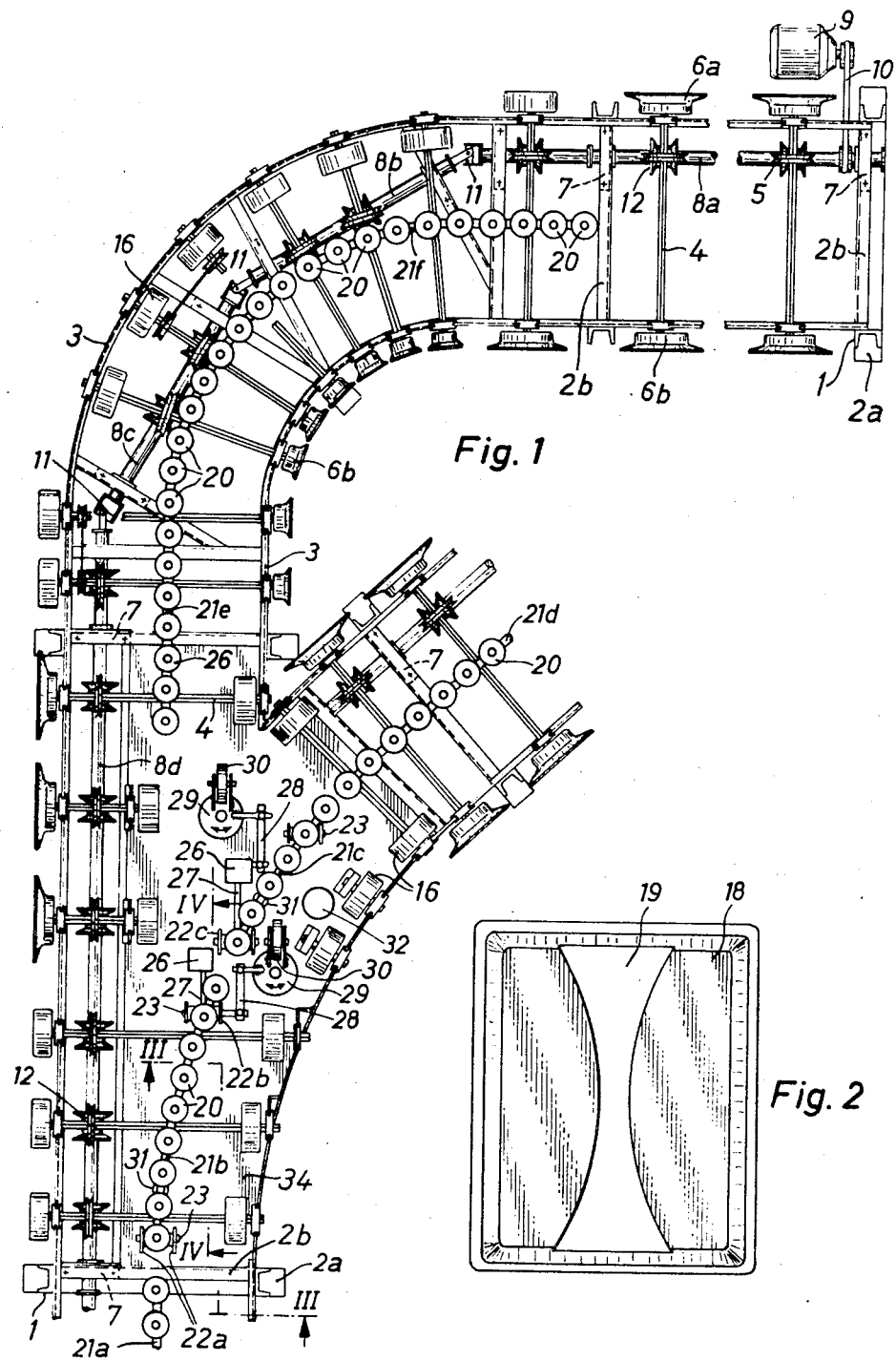

3,753,485

BRANCHING DEVICE AND GUIDE MEANS FOR HIGH-SPEED TRAY CONVEYORS

BACKGROUND OF THE INVENTION

1. Field of the Invention

The invention relates to conveyors, and in particular to high-speed tray-conveyors where successive load-carrying trays are individually propelled along the conveyor line and guided through bends and branches thereof by means of rollers engaging the trays on their bottoms.

2. Description of the Prior Art

In high-speed tray conveyors the trays have a tendency to push against the outside of bends in the conveyor path. This makes it necessary to provide guide means which prevent the trays from sliding out of line or even jumping the conveyor.

In one prior art solution it is suggested to arrange stationary guide planks alonside the conveyor at the level of the trays. These guide planks have the shortcoming that they act as a brake on the trays, thereby making high conveying speeds impossible.

Another prior art suggestion calls for the arrangement of horizontal guide rollers on both longitudinal bottom edges of the trays, the guide rollers engaging stationary C-shaped guide tracks mounted alongside the conveyor. This solution is not only costly from a manufacturing standpoint, it also eliminates the possibility of stacking the empty trays inside one another.

A further suggestion is contained in applicant's copending application P 21 39 791.1 filed on Aug. 9, 1971, where a simple horizontal guidance of the trays is obtained through flanged wheels which drive and guide the trays on their longitudinal edges.

Where it is necessary to provide branching stations in the conveyor system, it is conceivable that one might use the teaching of U.S. Pat. No. 1,022,823, by providing rollers in the area of the branching station whose axes are arranged obliquely to the main conveyor axis and by elevating these rollers so sufficiently over the straight-line guide rollers that the trays are removed from the latter and deflected to the branch conveyor. This solution is quite costly on the one hand, and on the other hand it fails to guarantee trouble-free operation at the desired high conveying speeds of about one meter per second, for example. At these speeds the inertia of the trays gives them a tendency to continue their straight-line motion so that they either simply overshoot the branching station or wind up sufficiently skewed to prevent them from entering the branch conveyor in the desired orientation.

A further known suggestion is contained in the U.S. Pat. No. 3,170,553 where the trays include horizontal guide rollers on their bottom side which are engaged within the branching station by a guide profile which serves as a deflecting switch. This solution has again the previously mentioned shortcoming of not permitting stacking of the empty trays. An additional problem resides in the necessity of wide spacing between successive trays on the conveyor so that the preceding tray has left the branching station before the next one reaches it, to permit the movement of the deflecting switch into the other position.

SUMMARY OF THE INVENTION

The invention has as its primary objection to provide a branching device for high-speed tray conveyors and appropriate guide means for the branching sections and bend section of the conveyor which give a reliable lateral tray guidance, while permitting a close spacing of successive trays even at high conveying speeds, in addition to using trays which are easily stackable.

The invention proposes to attain the above objective by suggesting a tray conveyor where the trays include longitudinal guide grooves in their bottoms and where the conveyor structure includes horizontal guide rollers which engage the guide grooves of the trays, whereby the shape of the guide grooves and the positioning of the guide rollers are so selected that they positively determine the conveying path of the trays, especially in the conveyor bends. The guide grooves for left-hand bends and right-hand bends are preferably combined into a single centrally located longitudinal groove in the tray bottom which also assures straight-line guidance of the trays.

In order to permit close spacing of successive trays on the conveyor the invention in a further improved embodiment suggests to arrange the switching guide rollers of the branching station in several successive groups, each group being mounted on a roller support which can be raised or lowered. Each roller support includes a switch which can be actuated by the passing tray, making it possible to lower each roller group immediately after passage of a tray, while the roller group behind it still engages that tray so that a closely following tray can be directed in a straight-line direction, if so desired.

BRIEF DESCRIPTION OF THE DRAWINGS

Further special features and advantages of the invention will become apparent from the description following below, when taken together with the accompanying drawings which illustrate, by way of an example, a preferred embodiment of the invention represented in the various figures as follows:

FIG. 1 represents a plan view of a portion of a tray conveyor including a right-hand branching station and subsequent right-hand bend section in the main conveyor line incorporating an embodiment of the invention;

FIG. 2 shows a bottom plan view of a tray for the conveyor of FIG. 1;

DESCRIPTION OF THE PREFERRED EMBODIMENT

Figure 3:
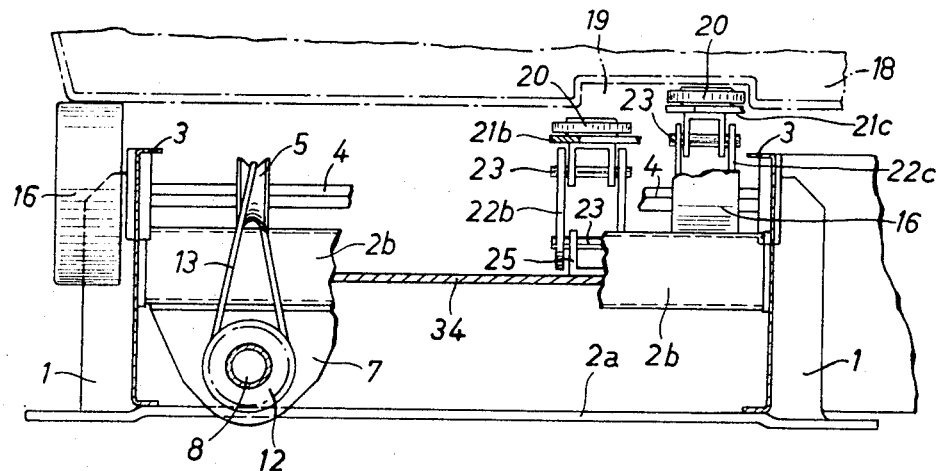
FIG. 3 represents a transverse cross section through the branching station taken along line III—III of FIG. 1, with portions cut away.

As illustrated in FIGS. 1, 2 and 3, the conveyor frame includes vertical lateral support profiles 1 linked together by transverse connecting members 2a and 2b and carrying two longitudinal frame profiles 3. In the longitudinal frame profiles ae journalled a plurality of transverse hexagonal shafts 4 which carry longitudinally displaceable belt pulleys 5 and on the shaft ends, outside the profiles 3, include either the flanged drive wheels 6a and 6b or the plain drive wheels 16 by which the trays are carried, propelled and laterally guided. To the connecting members 2a and 2b are mounted gussets 7 which include journals for the main drive shaft 8. The latter receives its drive from an electric motor 9 via a belt 10. In the area of the bend section the main shaft 8 is subdivided into several shaft sections 8a, 8b, 8c and 8d which are interconnected by means of universal joints. The main drive shaft 8 also carries a number of drive pulleys 12, one under each belt pulley 5, the pulleys 12 being frictionally engaged by the shaft 8 and connected to the belt pulleys 5 on the shafts 4 by means of belts 13.

In the bend section itself, the inner flanged wheels 6b have a reduced diameter so that, at the same rotational speed, they have a smaller circumferential drive speed with which they tend to show down the trays on their inner edges.

The conveyor includes in its bend section as well as in its branching section several groups of horizontal guide rollers 20 which are mounted on roller supports 21a to 21f, one for each roller group, and arranged at such a level that they engage a bottom groove 19 of the tray 18 which passes over it. The outline of the groove 19 resembles that of an hourglass so that the trays can run through both left-hand and right-hand bend sections or branching stations at high speed.

Figure 4:
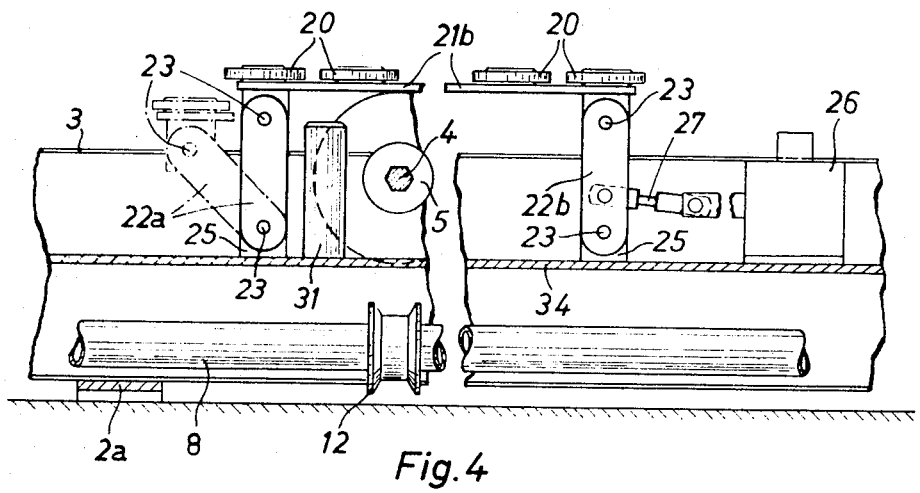
FIG. 4 represents a longitudinal cross section through the branching station taken along line IV—IV of FIG. 1, with portions thereof not shown and other portions shown in side view.

The roller supports 21b and 21c of the branching section are connected to pivot links 22a and 22b by means of pins 23, the lower pivot points of the links 22a and 22b being arranged on C-brackets 25 which are attached to a support panel 34 and including pivot pins 23. Each roller support 21b or 21c, respectively, forms a parallelogram linkage with its associated links 22a and 22b. To the link 22b is attached a connecting rod 27 which is operated by a solenoid 26. To each parallelogram linkage is also connected a control lever 28 whose other end is linked to a swivel mount 29 which carries a support roller 30 (FIG. 1). The lower position of the roller supports 21b and 21c is determined by abutment columns 31 (FIG. 4). At 32 of FIG. 1 is shown a proximity switch which, when actuated, causes the solenoid 26 to lower the roller support 21b.

When a tray 18 arriving in the branching station is to continue its straight-line motion, the roller supports 21b and 21c remain in their low position, out of engagement with the guide groove 19 of the tray, while the support rollers 30 point in the straight-line direction of the main conveyor.

The horizontal guide roller 20 on the fixed roller support 21a give the trays sufficient initial guidance to maintain their straight-line motion past the drive wheels 16, until they are again positively guided by the flanged wheels 6a and 6b and by the horizontal guide rollers 20 of the roller support 21f, from where they enter the subsequent right-hand bend section. Obviously, whenever a tray moves through a curve, either in the bend section or in the branching station, the flanged wheels 6a on the outside curve could only contact the tray corners while those on the inside curve contact the tray in midlength. Therefore, to avoid impacts and rattling on the outer flanged wheels 6a, the latter are replaced in the region of tray deflection by plain drive wheels 16 which merely carry the trays on their bottom surface. In these conveyor sections the positive lateral guidance of the trays is assured by the guide roller groups 21a through 21f.

When a particular tray is to be deflected into the branch conveyor, the solenoids 26 are energized as the tray reaches the branching section, whereby the solenoids, by means of the connecting rods 27, raise the parallelogram linkages of the roller supports 21b and 21c into engagement with the tray groove 19. This motion also causes the support rollers 30 to swivel into the direction of branching deflection. In this configuration the tray is positively guided by the rollers 20 of the roller supports 21b and 21c along a predetermined curve, whereupon the tray reaches another fixed group of rollers 20 on the roller support 21d leading it to the straight-line portion of the branch line of the conveyor.

The arrangement of a proximity switch 32 in the branching section permits a close spacing of successive trays which may be alternatively deflected or not deflected. The proximity switch 32 is actuated by a metal piece in the tray bottom so that, as soon as the tray leaves the first switching roller support 21b, the latter is immediately lowered, while the roller support 21c still guides the tray toward the branch exit. A closely following second tray may now be guided straight through the branching station.

It should be understood, of course, that the foregoing disclosure relates to only one preferred embodiment of the invention, but that it is intended to cover all changes and variations of the example herein chosen for purposes of disclosure which do not constitute departures from the spirit and scope of the invention as set forth in the appended claims.

What I claim is:

1. A branching device and guide means for a high speed tray conveyor with successive load-carrying trays propelled by supporting drive wheels along a conveyor comprising:

straight conveyor sections, curved sections and branching sections, said curved sections and branching stations arranged between said straight conveyor sections;

a plurality of load-carrying trays;

each tray provided in its bottom with a common guide-groove means, shaped to permit engagement with matingly shaped horizontal guide rollers, to permit said trays to travel selectively in succession over said straight and curved conveyor sections;

said conveyor sections each including at least one group of horizontal guide rollers and liftable and sinkable guide roller supports;

said rollers mounted on said supports for at least partial engagements with said guide groove means of said trays when said rollers are lifted; and means to actuate selectively each said group of said supports in said branching sections to raise and lower said guide rollers into and from at least a partial mating engagement with said guide grooves of said trays to direct said trays into said branching sections or to avoid it.

2. A device as defined in claim 1, wherein said guide groove means in the bottom of said tray has a single central longitudinal guide groove suitable for left-hand and right-hand conveyor path curvatures in the general outline of an hourglass.

3. A device as defined in claim 1, wherein said at least one group of the horizontal guide rollers of the branching station are subdivided into at least two groups of rollers which are each mounted on a roller support that is capable of being raised into and lowered out of engagement with the tray groove.

4. A device as defined in claim 3, wherein
each roller group is separately switchable, the movement of the roller groups being staggered in time in accordance with the tray motion through the branching station.

5. A device as defined in claim 4,
said means to actuate selectively each group of the roller supports including a solenoid-operated parallelogram linkage; and a tray actuated switching means; the solenoids responding to said tray-actuated switching means.

6. A branching device and guide means for a tray-conveyor with trays as claimed in claim 1,
said conveyor sections each including:
vertical lateral support profiles;
transverse connecting members linking together said profiles;
two longitudinal frame profiles carried by said transverse connecting members;
a plurality of transverse shafts journaled in said profiles;
longitudinally displaceable belt pulleys;
drive wheels on the said shafts on the outside of said profiles to carry, propel and laterally guide said trays;
a main drive shaft;
gussetts with journals for said main drive shaft mounted to said connecting members; and
a rotary power source connected with said pulley by a belt.

7. A branching device and guide means for a tray-conveyor with trays as claimed in claim 6;
said shaft subdivided in the areas of said curved conveyor sections into several shaft sections interconnected by universal joints;
a plurality of drive pulleys mounted on said shaft one under each belt pulley for frictional engagement by said main shaft and belts on said plurality of shafts connecting with said belt pulleys.

8. A branching device and guide means for a tray-conveyor with trays as claimed in claim 7,
said sheels in said curved sections each having a reduced diameter to provide a smaller circumferential drive speed at the same rotational speed to slow down the said trays on the inner ends.

9. A branching device and guide means for a tray-conveyor with trays as claimed in claim 1,
said roller supports of said branching sections connected to pivot links, including pivot pins;
a panel and C-shaped brackets attached to said panel, the lower pivot points of said links being arranged on said C-brackets;
each said roller support forming a parallelogram linkage associated with said links;
a connecting rod attached to one of said links, a solenoid operating said rod;
a swivel mount;
a support roller carried by said swivel mount;
a control lever linked with one end to said swivel mount and connected with said parallelogram;
abutment columns defining the power position of said supports;
a proximity switch controlling said solenoid to lower each said roller support, whereby when one of said trays arrives at said branching section and is to continue through to the next straight section, bypassing the branching section, said roller supports remain out of engagement with guide grooves of said tray, said support rollers pointing in the straight line of said conveyor sections past said drive wheels.

10. A branching device and guide means for a tray-conveyor with trays as claimed in claim 9,
each said straight conveyor section comprising flanged wheels;
each curved conveyor section including plain drive wheels, said flanged wheels and said drive wheels carrying said trays, whereby said respective group of guide rollers provides positive guidance.

11. A branching device and guide means for a tray-conveyor with trays as claimed in claim 9, further comprising means to deflect each said tray selectively into a curved section; whereby said solenoids raise the said parallelogram linkages of said roller supports into engagement with the respective said groove of said tray and to swivel said support rollers into the direction of the respective said branching section.

12. A branching device and guide means for a tray-conveyor with trays as claimed in claim 9, said device comprising in each said branching section a proximity swtich, said tray including in its bottom a projection for actuation of said switch, whereby upon passing the first switching roller support, said support is immediately lowered, while the subsequent roller support still guides said tray toward the exit of section. branching section.

13. A branching device and guide means for a tray-conveyor with trays as claimed in claim 1, said tray having shaped permitting them to be vertically stacked upon each other with their bottom protruding each the next lower tray.

* * * * *